July 12, 1932.  G. S. WARREN  1,866,588
ATTACHMENT FOR MOTION PICTURE CAMERAS
Filed June 14, 1928
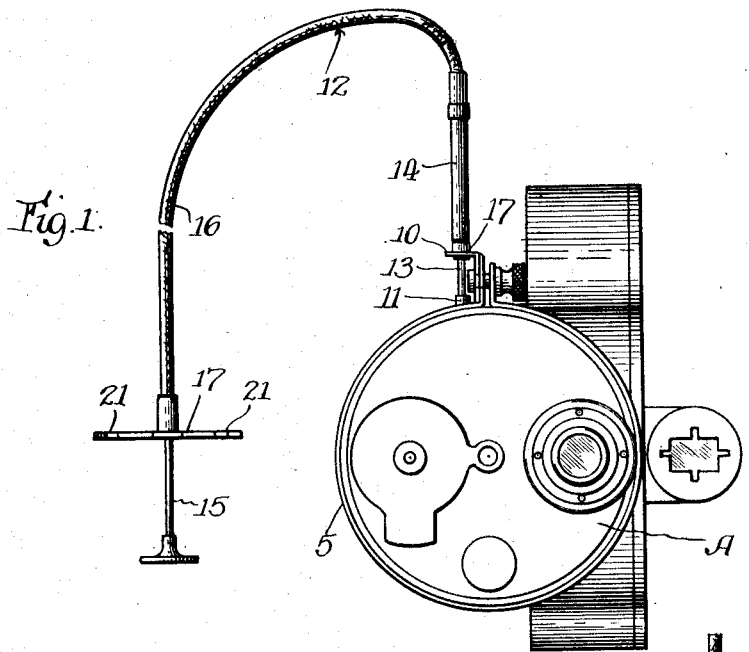
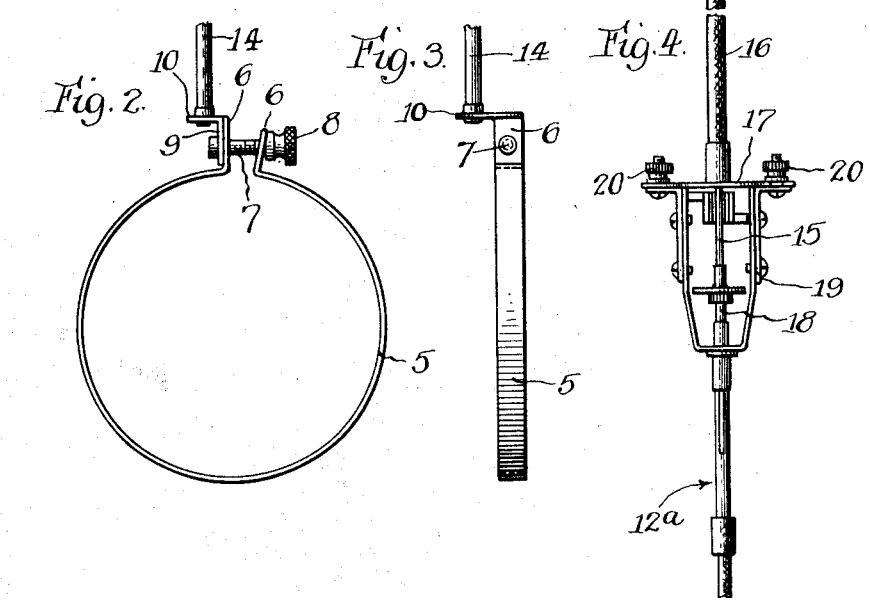
Inventor:
Guy S. Warren,
By Churchill Parker Nelson
Attys.

Patented July 12, 1932

1,866,588

UNITED STATES PATENT OFFICE

GUY S. WARREN, OF EVANSTON, ILLINOIS

ATTACHMENT FOR MOTION PICTURE CAMERAS

Application filed June 14, 1928. Serial No. 285,236.

The invention has reference generally to an attachment for motion picture cameras and more particularly to an attachment for the small or amateur size cameras known generally as cine-cameras.

Generally, in taking pictures with cameras of this type, the camera is held in the hand and the control of the camera in starting and stopping is customarily effected by pressing or releasing a button, lever or the like positioned in a convenient point upon the camera. However, in performing this operation, the inexperienced operator finds it extremely difficult to press or release the button without jarring or moving the camera to an appreciable extent, which movement results in spoiling the first pictures or frames taken by the camera.

It is an object of the invention therefore to provide an attachment for cameras of this type which permits the operator to start or stop the operation of the camera without imparting jar or movement thereto.

Moreover, on occasion, it is desirable, with this type of camera, to operate it from a point a considerable distance away from the camera. This occurs, for example, in the taking of moving pictures of wild life or in taking pictures of oneself.

It is another object of the invention to provide an attachment for a cine-camera by which the starting and stopping of the camera may be controlled by the operator from a remote position.

Other objects and advantages will appear in the following description and in the accompanying drawing, in which:

Figure 1 is a front elevation of a cine-camera with the invention attached thereto.

Figs. 2 and 3 are front and side views respectively of the device.

Fig. 4 is a plan view of a means by which the length of the actuating device may be increased.

While the invention is susceptible of various modifications and alternative constructions, I have shown in the drawing and have herein described in detail the preferred embodiment, but it is to be understood that I do not thereby intend to limit the invention to the specific form disclosed, but intend to cover all modifications and alternative constructions falling within the spirit and scope of the invention as expressed in the appended claims.

Generally the invention comprises a clamp adapted to be secured rigidly in an appropriate position upon a cine-camera generally indicated at A, which clamp supports an actuating device in position to impart a starting or stopping movement to the button or lever which controls the operation of the camera.

More particularly described, the invention comprises a clamping member 5 which, in the present instance, is shown as being a split collar formed of some suitable resilient material. Each of the split ends of the collar are turned outwardly to extend radially therefrom forming flanges 6. Suitable means is provided for drawing the split ends of the collar together which, in this instance, comprises a bolt 7 preferably carried rigidly on one of the flanges to extend toward the other flange which is suitably apertured to receive the end of the bolt. A knurled nut 8 having a screw threaded engagement with the bolt 7 operates to draw the split end of the collar together after the collar has been properly positioned on the camera.

The clamp 5 carries rigidly fixed thereto a substantially L-shaped bracket 9 which, as shown in Figs. 2 and 3, is offset to provide a portion 10 arranged to extend substantially parallel to the surface of the camera after the clamp has been firmly affixed thereto. The clamp and bracket are so proportioned that the parallel extending portion 10 of the bracket overlies the operating button 11 of the camera in spaced relation thereto. The portion 10 of the bracket has therein a screw threaded aperture which, when the bracket is mounted on the camera, extends substantially coaxially of the operating button.

The means by which the button is depressed to start the camera or released to stop the camera comprises a generally well known type of device 12 including a plunger 13 mounted for reciprocation in a casing 14 and actuated by means of a finger piece 15 through the intermediate agency of a flexible coupling which is sheathed in a flexible protecting tube 16. The end of the casing 14 is screw threaded as at 17 to engage the screw threaded aperture in the bracket portion 10 which manner of mounting positions the plunger 13 substantially upon the axis of reciprocation of the button 11. Thus by pressing or releasing the finger piece 15 the plunger 13 may be made to depress or release the button 11 to start or stop the camera. Inasmuch as the force which operates the button 11 is applied to a point remote therefrom, it will be obvious that the button may be actuated without jar or movement of the camera.

While the actuating device 12 will in most instances be of sufficient length to operate the camera, it is contemplated that occasions may arise which necessitate the use of an actuating device of longer length. To this end a coupling has been provided by which an auxiliary actuating extension 12ᵃ may be operatively attached to the actuating device 12.

Referring to Figs. 1 and 4, the end of the tube 16 adjacent the finger piece 15 has rigidly secured thereto a cross bar 17 which normally facilitates the operation of the finger piece 15. The extension 12ᵃ is provided with an auxiliary actuating plunger 18 which operates in substantially the same manner as the plunger 13 in the actuating device 12. The means by which the extension may be easily and quickly coupled to the actuating device 12 comprises, as shown herein, a yoke 19 carried by one end of the extension and extending axially of the plunger so as to straddle the end of the finger piece 15. The free ends of the yoke 19 are turned outwardly to abut the ends of the cross bar 17 and carry thereon a means for securing the yoke to the cross bar, such as the clamping nuts 20 which engage suitably formed slots 21 in the ends of the the cross bar 17. Thus the auxiliary device may be secured to the actuating device 12 with the auxiliary plunger 18 in operative engagement with the finger piece 15. This having been done it becomes a simple matter to support the cine-camera at a desired position, as by means of a tripod or the like, and to operate the camera from a remote point, enabling the operator to photograph himself or to obtain pictures of wild life.

While I have shown and described the attachment as being particularly adapted for use with a cine-camera in which the actuating button 11 is positioned adjacent a substantially circular front face, it will be apparent that it is only necessary to change the shape and form of the clamp in order to position the bracket and the plunger in operative relation to the actuating button or lever as embodied in the different types of cine-cameras.

It will be apparent from the foregoing that an attachment has been provided in which an operating device may be mounted upon a cine-camera in such position that the operation thereof may be started and stopped without danger or liability of jarring or moving the camera while so doing. Moreover the attachment is capable of permitting pictures to be taken while the operator is stationed at a position remote from the camera.

I claim as my invention:

1. An attachment for cine-cameras and the like comprising, in combination, a split collar adapted to engage a part of the surface of the camera, means for drawing the split ends of the collar together to secure the clamp on the camera, an L-shaped bracket carried by said collar with the free leg of said bracket overlying the control device of the camera when the collar is fixed thereto, a plunger carried by said bracket and adapted to engage said control device, and means for actuating said plunger.

2. An attachment for cine-cameras and the like comprising, in combination, a support adapted to engage opposed portions of the external surface of a camera and including means for rigidly affixing said support thereto, a rigid member on said support extending outwardly away from the surfaces of said camera and support into a position overlying the control device of the camera when the support is affixed thereto, a reciprocable plunger carried by said member for alined movement relative thereto in the direction of movement of said camera actuating means, and means for actuating said plunger.

In testimony whereof, I have hereunto affixed my signature.

GUY S. WARREN.